US006709222B2

United States Patent
Inman, Jr.

(10) Patent No.: US 6,709,222 B2
(45) Date of Patent: Mar. 23, 2004

(54) DURABLE MEDICAL EQUIPMENT HAND TRUCK

(76) Inventor: James A. Inman, Jr., Rte. 1 Box 83, McLeansboro, IL (US) 62859

( * ) Notice: Subject to any disclaimer, the term of this patent is extended or adjusted under 35 U.S.C. 154(b) by 45 days.

(21) Appl. No.: 10/216,207

(22) Filed: Aug. 12, 2002

(65) Prior Publication Data

US 2004/0028512 A1 Feb. 12, 2004

(51) Int. Cl.[7] .................................................. B62B 1/14
(52) U.S. Cl. .................. 414/490; 280/47.18; 280/47.23
(58) Field of Search .................. 414/490, 444, 414/455; 280/47.18, 47.19, 47.23, 47.24, 47.29

(56) References Cited

U.S. PATENT DOCUMENTS

| 2,654,493 | A |   | 10/1953 | Kernkamp |  |
|---|---|---|---|---|---|
| 2,795,433 | A |   | 6/1957 | Moriarty |  |
| 4,703,944 | A | * | 11/1987 | Higson | 280/47.18 |
| 4,921,270 | A | * | 5/1990 | Schoberg | 280/47.28 |
| 5,120,183 | A |   | 6/1992 | Phillips | 414/490 |
| 5,738,480 | A | * | 4/1998 | Butzen | 414/490 |
| 5,975,826 | A |   | 11/1999 | Scholder | 414/444 |
| 5,993,134 | A | * | 11/1999 | Williamson | 414/490 |
| 6,131,927 | A | * | 10/2000 | Krawczyk | 280/47.29 |
| 6,398,235 | B1 | * | 6/2002 | Cary | 280/47.26 |
| 6,557,869 | B2 | * | 5/2003 | Gillette et al. | 280/47.28 |
| 6,616,152 | B2 | * | 9/2003 | Oliver | 280/47.18 |

\* cited by examiner

Primary Examiner—James R. Bidwell
(74) Attorney, Agent, or Firm—Richard C. Litman

(57) ABSTRACT

A durable medical equipment transport system having a frame with a top and a bottom. Attached to the bottom of the frame is a foot having a top and bottom surface and an axle having two wheels. Attached to the top of the frame are two arms which are adjustable between a folded position generally parallel to the frame and an extended position generally normal to the frame. The invention further has a pair of extension forks attached to the bottom of the frame. The extension forks are adjustable between a folded position generally parallel to the frame and an extended position generally normal to the frame. The invention further has a C shaped bracket attached to the top surface of the foot.

6 Claims, 5 Drawing Sheets

DURABLE MEDICAL EQUIPMENT HAND TRUCK

BACKGROUND OF THE INVENTION

1. Field of the Invention

The present invention relates to hand trucks, in particular, to a hand truck specially constructed to transport durable medical equipment.

2. Description of the Related Art

With health care costs on the rise, many patients with chronic conditions seek to treat their disorders in the comfort and privacy of their own homes. This has created a great demand for at home durable medical equipment including, for example, oxygen tanks, oxygen concentrators and bed split spring assemblies. The unusual size and weight of this equipment presents a plethora of challenges to those responsible for its delivery. Nothing in the prior art shows a single device capable of delivering all the abovementioned types of durable home medical equipment.

U.S. Pat. No. 2,654,493 to Kernkamp discloses a oxygen tank truck. The truck has a vertical frame with horizontal side bars adapted to interface with the rounded surface of an oxygen tank. Horizontal clamps hold the tanks in place and the truck rolls on several attached wheels. The hand truck disclosed in the '493 patent differs from the present invention in that it lacks extension arms and extension forks and thus cannot be used with other types of medical equipment.

U.S. Pat. No. 2,195,433 to Moriarty discloses an improved hand truck having a fixed loading platform and load engaging arms which are adapted to be positioned to retain a load on the platform. The '433 invention differs from the present invention in that the present invention has extension arms which are foldable into a non-extended position and the present invention has extension forks not present in the '433.

U.S. Pat. No. 5,120,183 to Phillips discloses a load transporting dolly. The dolly has a frame with a flange on the lower end thereof and a foot to be positioned in spaced relation with the flange. The invention further has arms positioned normal to the frame for holding loads. The '183 invention differs from the present invention in that the present invention has two extendable forks as well as a bracket disposed upon the toe plate.

U.S. Pat. No. 5,975,826 to Scholder discloses a two wheeled hand truck with attachments and an elevating mechanism incorporated into the body. The '826 invention differs from the present invention in, among other ways, that it lacks foldable extension arms and foldable extension forks.

None of the above inventions and patents, taken either singly or in combination, is seen to describe the instant invention as claimed. Thus a durable medical equipment hand truck solving the aforementioned problems is desired.

SUMMARY OF THE INVENTION

The present invention is a hand truck modified to transport several common types of durable medical equipment including oxygen tanks, oxygen concentrators and split spring bed assemblies. The hand truck has a frame with a top end and a bottom end, made from two vertical rails connected by a handle, and a plurality of transverse bars. An axle and a pair of wheels disposed at the bottom of the frame serve as the pivot point of the frame when the device is lifting objects. The axle and wheels also permit smooth travel over rough ground. A pair of upper arms have tubular ends that are pivotally mounted to a bar on the top end of the frame. The arms pivot up and down around a horizontal axis. The hand truck also has a pair of lower forks having attachment ends that are fixed to a horizontally disposed bar disposed at the bottom end of the frame. The forks are capable of rotating around a horizontal axis. The hand truck also has a flat generally rectangular foot fixed normally to the bottom end of the frame. Disposed upon the foot is a C shaped bracket.

Accordingly, it is a principal object of the invention to provide a modified hand truck.

It is another object of the invention to provide a modified hand truck capable of transporting several common pieces of durable medical equipment.

It is a further object of the invention to provide a hand truck that can transport several unwieldily pieces of equipment and is also capable of being stored in a small space.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
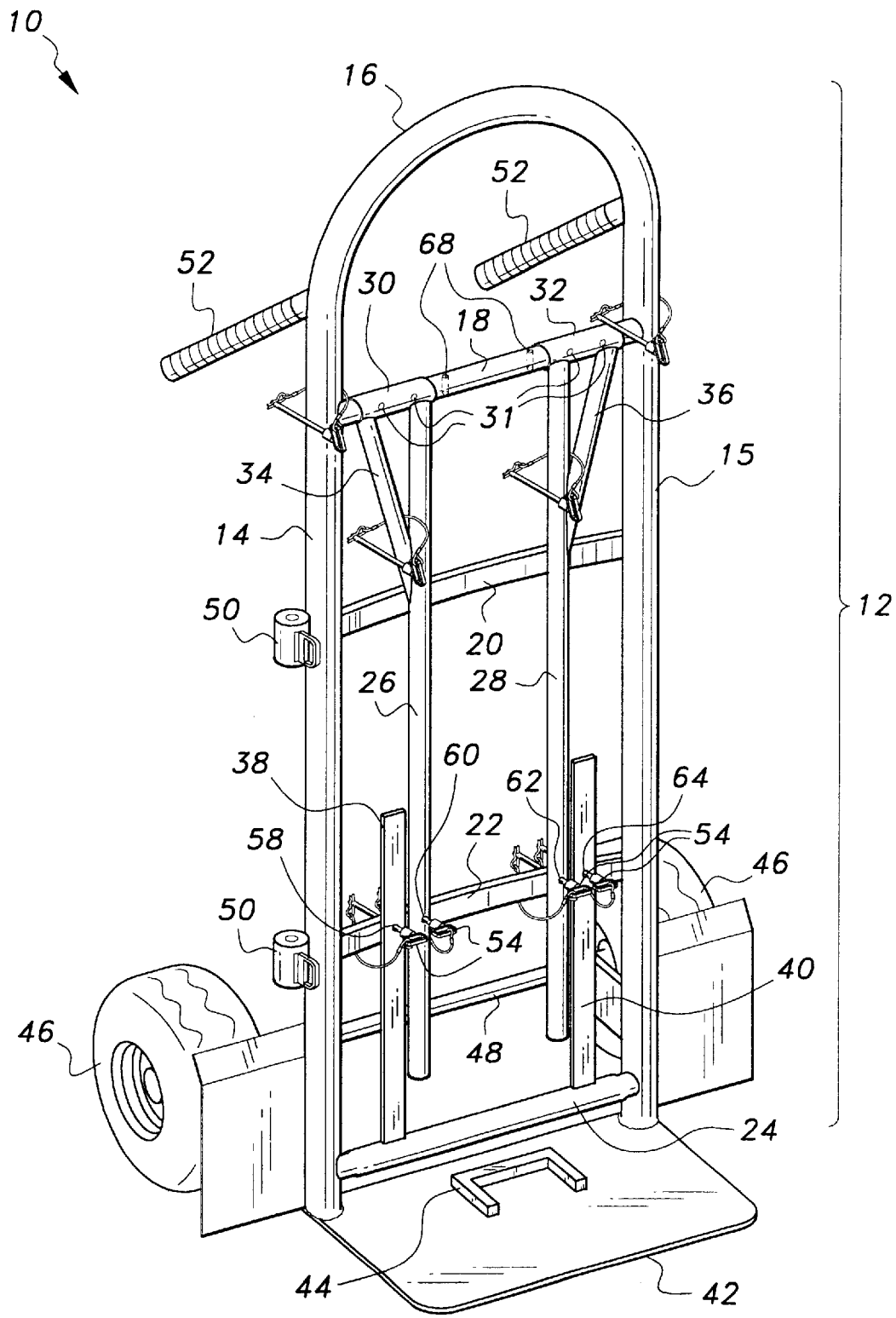
FIG. 1 is a perspective view of a durable medical equipment transport system according to the present invention with its arms and extension forks in the folded position.

The durable medical equipment hand truck 10, as illustrated in FIG. 1, is a hand truck having several modifications adapting it to transport several heavy and/or cumbersome commonly used pieces of medical equipment. The hand truck 10 has a frame 12 with a top end and a bottom end. The frame 12 has two vertical rails 14, 15 connected by a handle 16. The handle 16 is positioned at the top end of the frame 12. Four horizontally disposed bars 18, 20, 22, 24 are disposed between the vertical rails 14, 15. Two arms 26, 28 are attached to the top bar 18. The arms 26, 28 each have a tubular attachment end 30, 32 and a support brace 34, 36. Several holes 31 are defined in the tubular attachment ends 30, 32. The top bar 18 travels through the tubular attachment ends 30, 32. The arms 26, 28 may be rotated with the top bar 18 serving as the axis of rotation.

Two forks 38, 40 may also be attached to the bottom bar 24. The forks 38, 40 are preferably fixed to the bottom bar 24 which is capable of rotating around a horizontal axis. A foot plate 42 having a top surface and a bottom surface is normally disposed at the bottom end of the frame 12. A "C" shaped bracket 44 is fixed to the top surface of the foot plate 42.

Two wheels 46 are disposed upon an axle 48 which is attached to the bottom of the frame 12. One preferably spring-loaded, ratchet type strap 50 is attached to one of the rails 14 adjacent to each of the middle bars 20, 22. The hand truck 10 further has two hand grip 52 extending rearward from the handle 16.

The arms 26, 28 and the forks 38, 40 are each held in position by a pin 54 when not extended, as shown in FIG. 1. Each pin 54 is ordinarily secured to the frame 12 when not in use. Ordinarily, each pin 54 is inserted into one of several holes 58, 60, 62, 64 running through each arm 26, 28 or fork 38, 40 and into the associated bar 22. In this way the pins 54 function to hold their associated arm 26, 28 or fork 38, 40 to the bar 22.

In this application the term "pin" ordinarily means spring clip type pins. However, the invention is not limited to spring clips. Wire lock pins, detent ring pins and any other similar method of securing the arms and forks in position now known or developed in the future are also within the scope of the invention.

Figure 2:
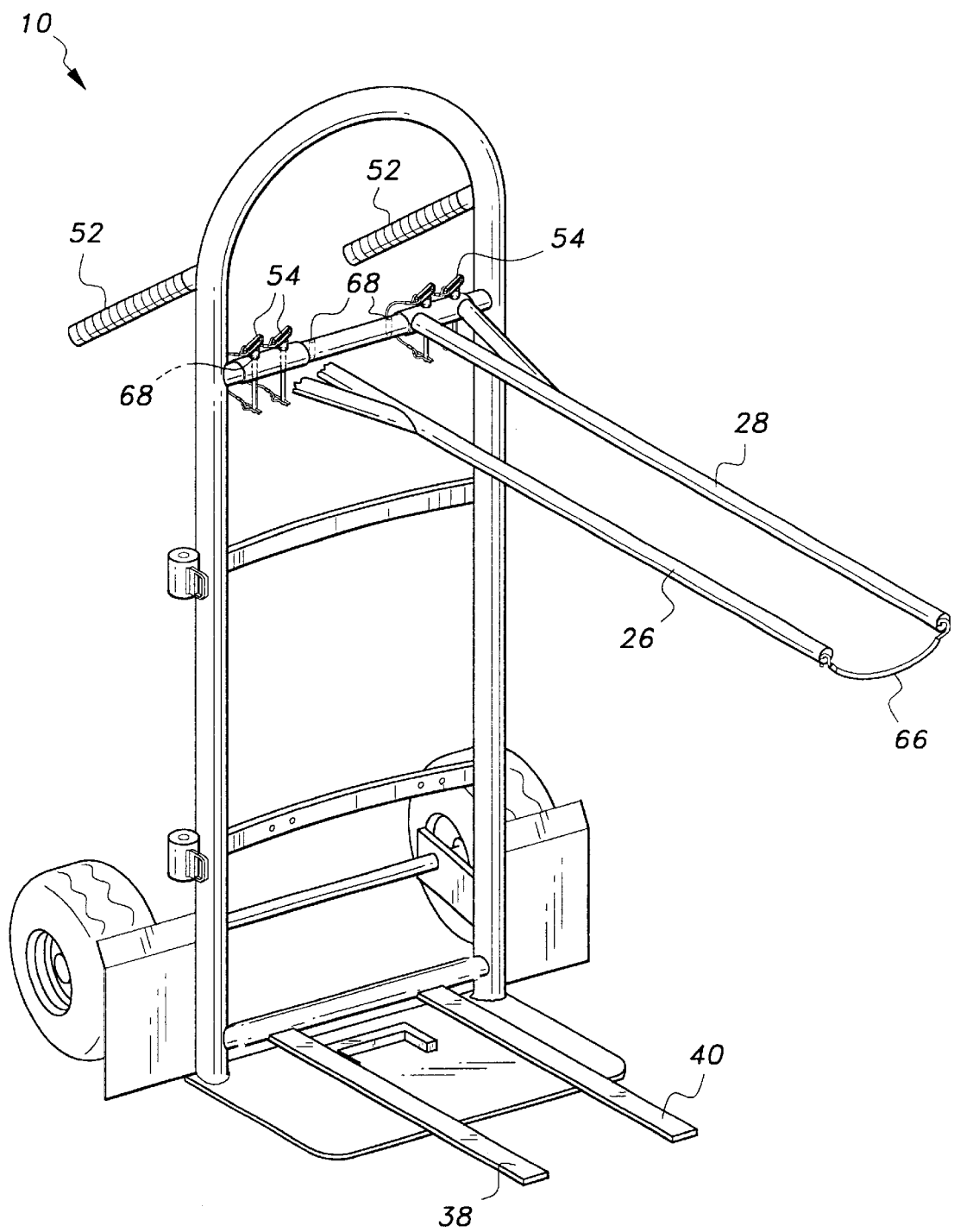
FIG. 2 is a perspective view of the present invention with its arms and extension fork in the extended position.

FIG. 2 shows the durable medical equipment hand truck 10 with its arms 26, 28 and forks 38, 40 in the extended position rather than the folded position shown in FIG. 1. A tether 66 may be used to connect the ends of the arms 26, 28. Preferably several pins 54 are used to hold the arms 26, 28 in position. The pins 54 travel through the aforementioned holes 31 defined in the tubular attachment ends and then run through one of several holes 68 defined in the top bar 18. The tubular attachment end 30 has been omitted to show the holes 68 on one side of the top bar 18. The holes are in similar positions on both sides of the top bar 18 and allow the distance between the arms 26, 28 to be adjusted.

Figure 3:
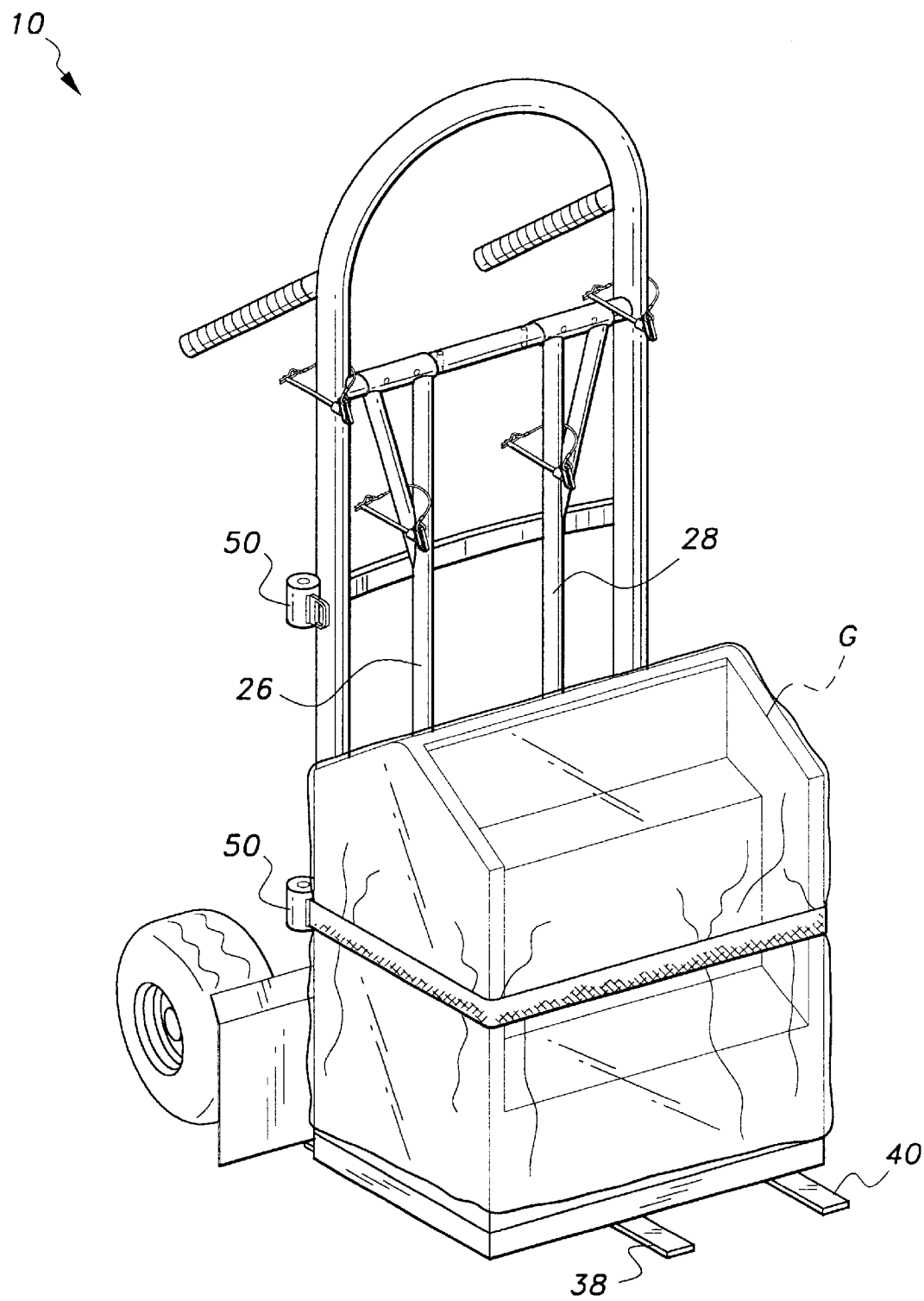
FIG. 3 is a perspective view of the present invention holding an oxygen concentrator.

FIG. 3 illustrates the durable medical equipment hand truck 10 carrying an oxygen concentrator G. The extension forks 38, 40 are fully extended and one strap 50 has been extended and secures the oxygen concentrator in position. The arms 26, 28 are in the down position to make room for the oxygen concentrator.

Figure 4:
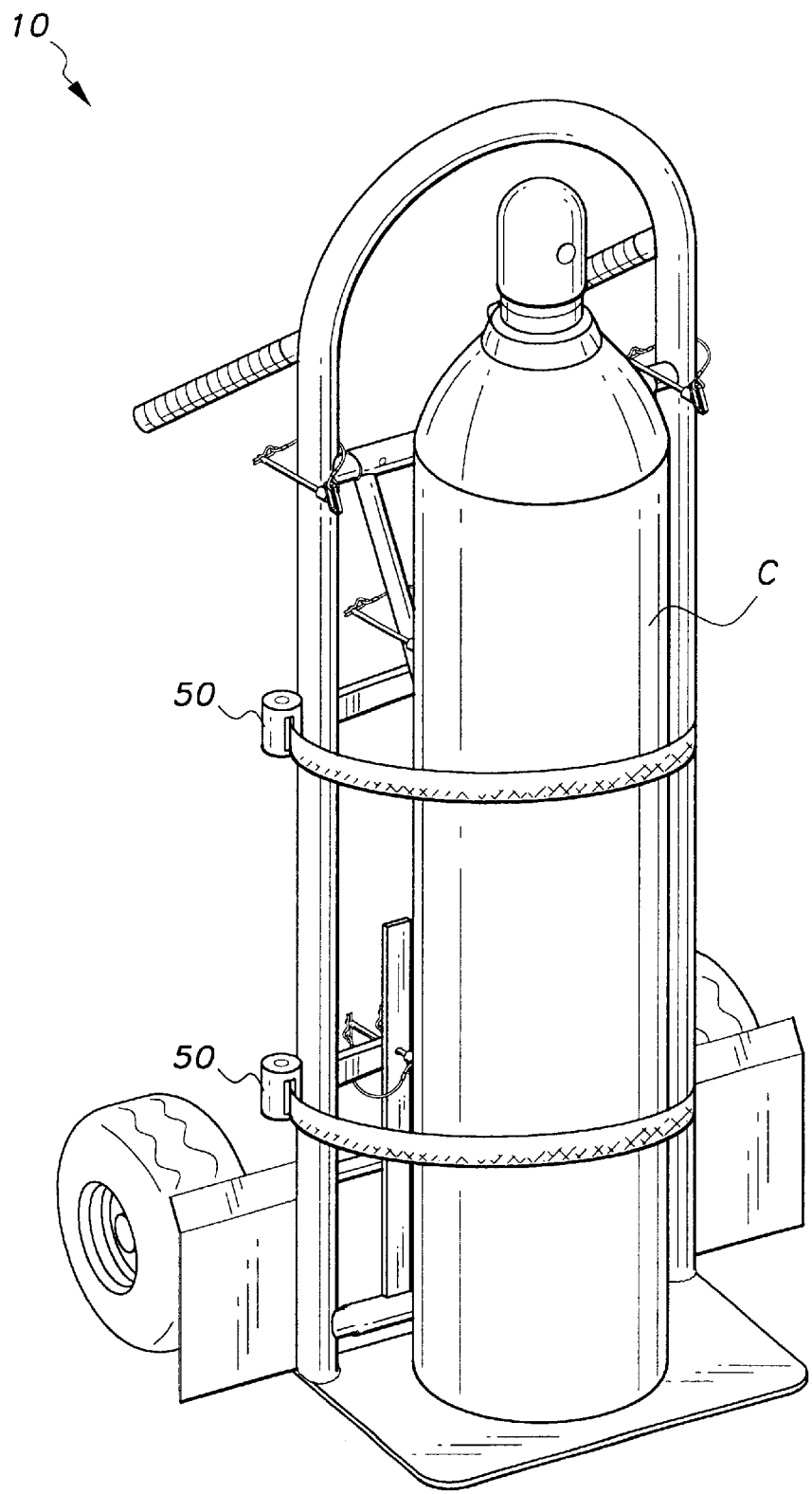
FIG. 4 is a perspective view of the present invention holding an oxygen tank.

FIG. 4 illustrates the durable medical equipment hand truck 10 with an attached oxygen tank C. Both straps 50 are used to secure the tank C.

Figure 5:
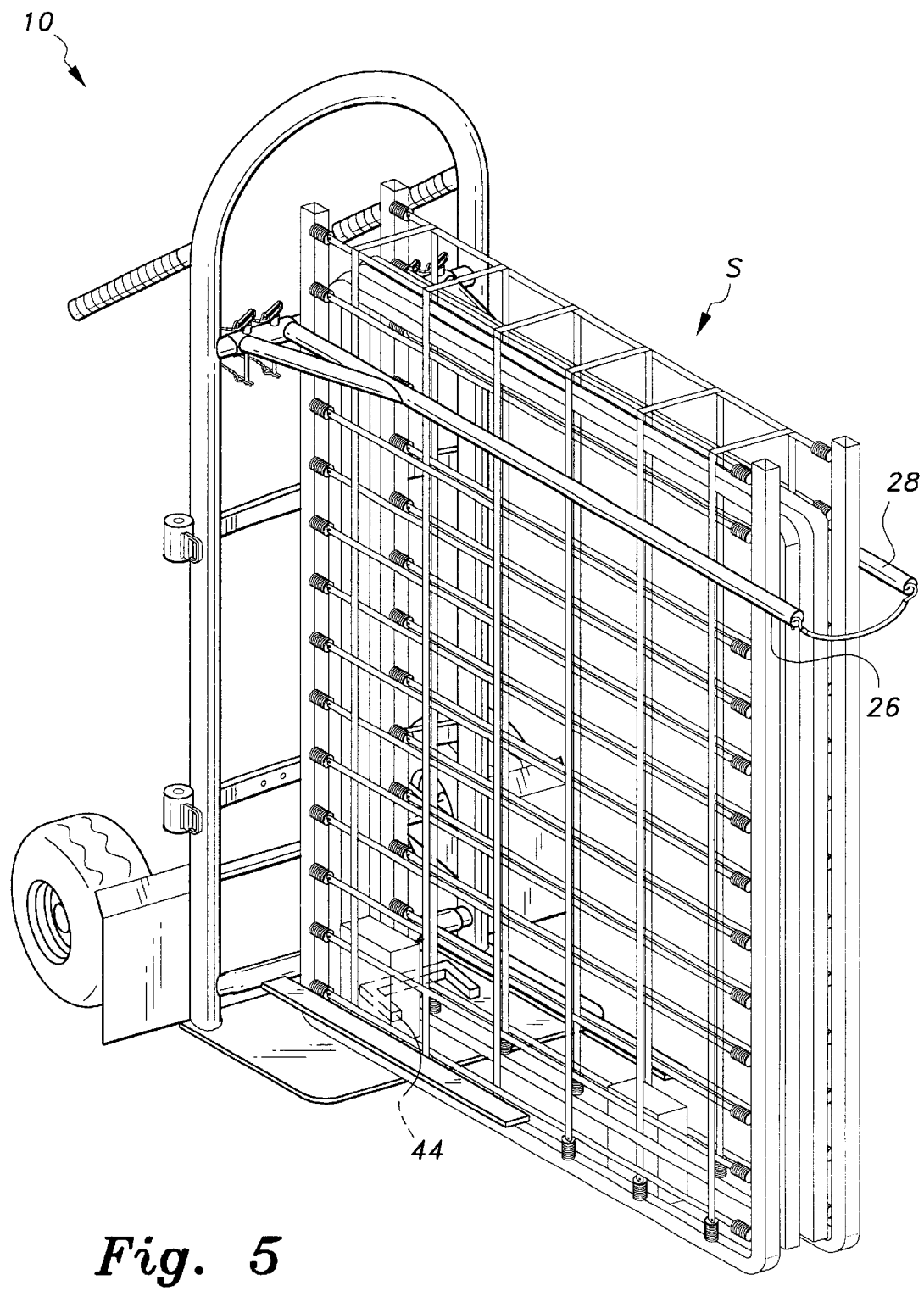
FIG. 5 is a side view of the present invention holding a split spring assembly.

FIG. 5 is a side view of the durable medical equipment hand truck 10 with an attached split spring assembly S. The spring assembly S is positioned between the two arms 26, 28 and inside the C shaped bracket 44.

It is to be understood that the present invention is not limited to the embodiment described above, but encompasses any and all embodiments within the scope of the following claims.

I claim:

1. A durable medical equipment hand truck, comprising:
    a frame having a top end and a bottom end, the frame further having:
        two substantially vertical rails each having top and bottom ends;
        a substantially horizontal handle disposed upon the top ends of said rails;
        a plurality of bars disposed transversely between said rails;
    two arms, each arm having an attachment end and an opposing free end, with the attachment end of each arm being disposed on one said bar generally adjacent to the top end of said frame;
    a foot plate having a top and a bottom surface, the foot plate being disposed normally at the bottom of said frame;
    an axle having two opposing ends, the axle being disposed at the bottom end of said frame;
    two wheels disposed at the opposing ends of said axle, respectively;
    a generally C-shaped bracket disposed upon the top surface of said foot plate;
    wherein said arms are pivotally attached to one of said bars, being capable of rotating from a position generally parallel to said vertical rails to a position normal to said rails.

2. The durable medical equipment hand truck as in claim 1, further comprising:
    at least two straps disposed upon one said rail.

3. The durable medical equipment hand truck as in claim 2, wherein:
    said straps are ratcheting straps.

4. The durable medical equipment hand truck as in claim 1, further comprising:
    a plurality of pins;
    wherein said frame has at least three bars; an upper bar, a middle bar and a lower bar;
    wherein the attachment ends of said arms have several holes defined therein;
    wherein said upper bar has several holes defined therein;
    wherein a plurality of holes are defined in the free end of said forks;
    wherein said middle bar has a plurality of holes defined therein; and
    wherein said pins are insertable into the holes defined in said arms and said forks.

5. The durable medical equipment hand truck as in claim 1, further comprising:
    two hand grips extending from said handle; and
    a tether disposed upon the free ends of said arms.

6. The durable medical equipment hand truck as in claim 1, further comprising:
    two extension forks each having an attachment end and a free end, said forks being disposed upon the bottom of said frame;
    wherein said forks are capable of rotating from a position generally parallel to said vertical rails to a position normal to said rails.

* * * * *